US012802038B2

(12) United States Patent
Markowitz

(10) Patent No.: US 12,802,038 B2
(45) **Date of Patent: *Nov. 17, 2026**

(54) VIDEO ENHANCED TIME TRACKING SYSTEM AND METHOD

(71) Applicant: Philip Markowitz, Los Angeles, CA (US)

(72) Inventor: Philip Markowitz, Los Angeles, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 19/063,176

(22) Filed: Feb. 25, 2025

(65) Prior Publication Data

US 2025/0200522 A1 Jun. 19, 2025

Related U.S. Application Data

(63) Continuation of application No. 18/227,806, filed on Jul. 28, 2023, now Pat. No. 12,236,402, which is a continuation of application No. 17/396,071, filed on Aug. 6, 2021, now Pat. No. 11,748,712, which is a continuation-in-part of application No. 17/418,750, filed as application No. PCT/US2021/038189 on Jun. 21, 2021, now abandoned, which is a continuation of (Continued)

(51) Int. Cl.

| | |
|---|---|
| ***G06V 20/40*** | (2022.01) |
| ***G06Q 10/1091*** | (2023.01) |
| ***G06V 20/52*** | (2022.01) |
| ***G06V 40/16*** | (2022.01) |
| ***H04N 7/18*** | (2006.01) |

(52) U.S. Cl.
CPC ......... *G06Q 10/1091* (2013.01); *G06V 20/40* (2022.01); *G06V 20/52* (2022.01); *G06V 40/172* (2022.01); *H04N 7/183* (2013.01)

(58) Field of Classification Search
CPC .... G06Q 10/1091; G06V 20/52; G06V 20/40; G06V 40/172; G06V 20/17; H04N 7/183; B64U 10/13
See application file for complete search history.

(56) References Cited

U.S. PATENT DOCUMENTS

| | | | | |
|---|---|---|---|---|
| 7,634,598 B2 * | 12/2009 | Kim | G06Q 50/16 | 710/2 |
| 7,714,878 B2 * | 5/2010 | Gabay | H04L 65/70 | 345/626 |
| 10,044,988 B2 * | 8/2018 | Bulan | G06Q 50/12 | |

(Continued)

*Primary Examiner* — Jayanti K Patel
(74) *Attorney, Agent, or Firm* — Trojan Law Offices, P.C.

(57) ABSTRACT

A video enhanced time tracking system is provided. The system may include a video capturing device, software applications (such as an application running on the video capturing device), and a backend system. The application may include a time tracking application that tracks time simultaneously as the video capturing device captures video. The captured video and the tracked time information may be uploaded to the backend system where it may be stored and processed. The system may correlate the tracked time information with the captured video and provide it to a client for review. In some embodiments, the system also includes an image recognition system that recognizes the user to authenticate the user's identity, that recognizes the user's workspace to determine when the user is working, and that recognizes the work being performed to determine the client that the user may be working for.

17 Claims, 8 Drawing Sheets

Related U.S. Application Data application No. 16/932,545, filed on Jul. 17, 2020, now Pat. No. 10,977,619.

(56) References Cited

U.S. PATENT DOCUMENTS

| | | | | |
|---|---|---|---|---|
| 10,366,298 | B2 * | 7/2019 | Yiu | G06V 10/255 |
| 2013/0290154 | A1 * | 10/2013 | Cherry | G06Q 10/1091<br>705/32 |
| 2017/0061229 | A1 * | 3/2017 | Rastgar | G06T 7/248 |
| 2017/0262704 | A1 * | 9/2017 | Wnuk | G06F 16/583 |
| 2019/0066169 | A1 * | 2/2019 | Costello | G06Q 20/18 |
| 2019/0369641 | A1 * | 12/2019 | Gillett | B25J 9/08 |
| 2020/0066405 | A1 * | 2/2020 | Peyman | G06N 3/08 |
| 2020/0226896 | A1 * | 7/2020 | Robertson | G06Q 10/1091 |
| 2020/0371744 | A1 * | 11/2020 | Liao | G06F 3/167 |

* cited by examiner

VIDEO ENHANCED TIME TRACKING SYSTEM AND METHOD

CROSS RELATED APPLICATIONS

This application is a continuation of U.S. patent application Ser. No. 18/227,806, filed on Jul. 28, 2023, which is a continuation of U.S. patent application Ser. No. 17/396,071, filed on Aug. 6, 2021, now U.S. Pat. No. 11,748,712, which is a continuation-in-part of U.S. application Ser. No. 17/418,750, filed Jun. 25, 2021, which is a national stage entry of PCT/US21/38189, filed Jun. 21, 2021, which claims priority to and benefit of U.S. Non-Provisional patent application Ser. No. 16/932,545, filed on Jul. 17, 2020, now U.S. Pat. No. 10,977,619. The content of each is incorporated hereto by reference in its entirety.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to time tracking, including a framework, system, and method for video enhanced time tracking.

BACKGROUND OF THE INVENTION

Hourly billing for services provided by contracted labor is commonplace throughout the world. In most cases, the contractor keeps track of his/her time spent on a particular project for a particular client, and bills the client according to an hourly rate based on the number of hours spent on the project.

In some cases, the contractor may keep track of his/her time spent manually. In other cases, the contractor may use an automated system to track his/her time spent on a project. However, in either of these cases, it is difficult for the client to know for sure that the billing accurately reflects the actual amount of time spent on any particular project. Given this, the danger of overbilling is prevalent.

Accordingly, there is a need for a time tracking system that provides proof to a client that the time billed accurately reflects the time spent on a particular project. There also is a need for a video enhanced time tracking system that tracks time spent by the contractor on a particular project, and that simultaneously captures video of the contractor performing the work. There also is a need for a system that correlates the captured video with the tracked time and that provides the information to the client in an easy to understand format. There also is a need for a system that allows the client to watch the captured video in real time, and/or to review the captured video at any time during or after the work is performed. There is also a need for a system that provides transparency for the client in reviewing what work has been completed and confirms that the work has been completed efficiently.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification. None of the drawings are to scale unless specifically stated otherwise.

DETAILED DESCRIPTION OF THE INVENTION

Figure 1:
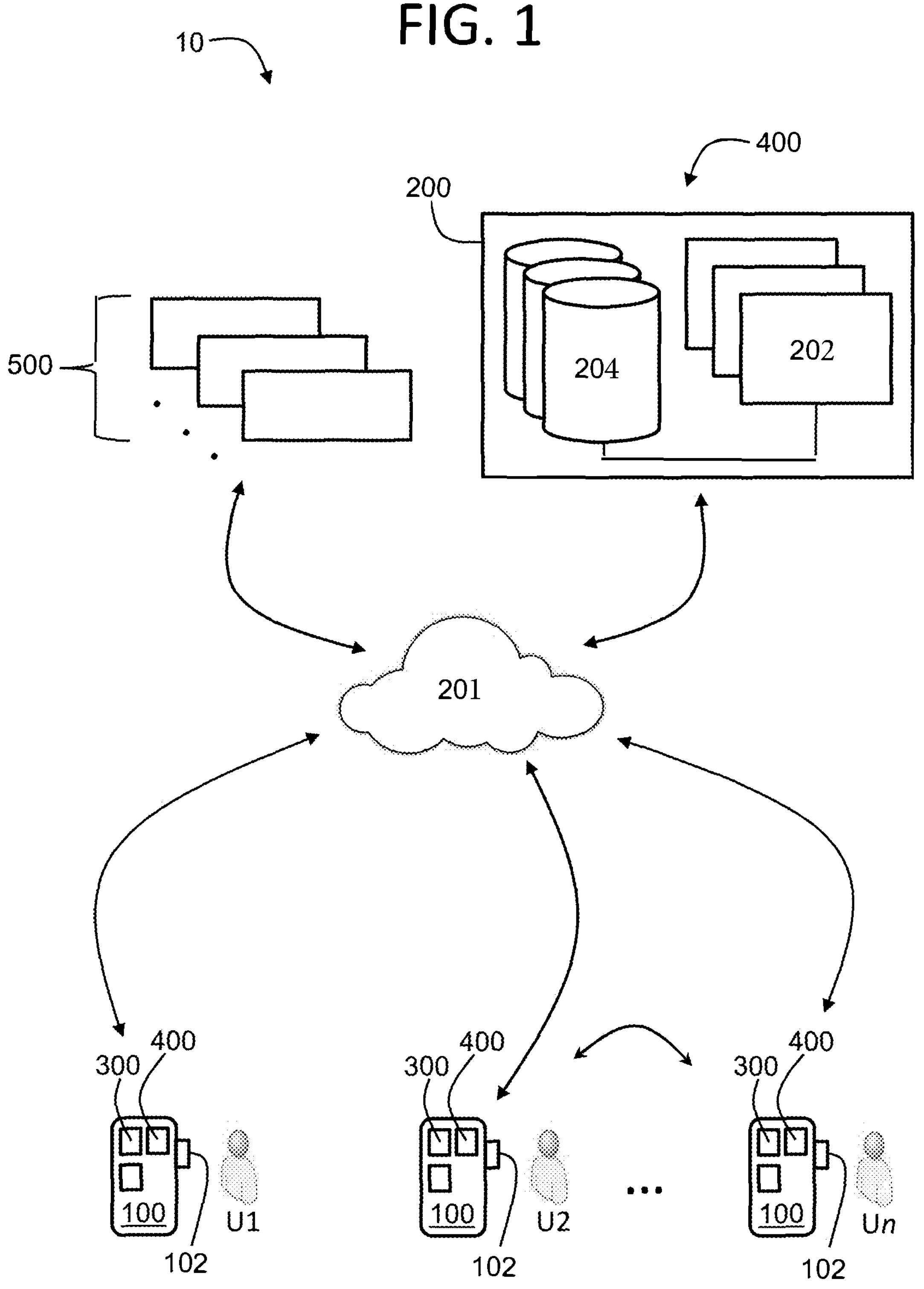
FIG. 1 shows an overview of a video enhanced time tracking system in accordance with exemplary embodiments hereof.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

As used in this description, the term "portion" means some or all. So, for example, "A portion of X" may include some of "X" or all of "X". In the context of a conversation, the term "portion" means some or all of the conversation.

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of XYZs" may include one or more "XYZs".

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram the activities associated with those boxes may be performed in any order, including fully or partially in parallel.

It will be understood that when an element is referred to as being "on" another element, it can be directly on the other element or intervening elements may be present there between. As used herein, the term "and/or" includes any and all combinations of one or more of the associated listed items.

As used herein, the singular forms "a," "an," and "the," are intended to include the plural forms as well, unless the context clearly indicates otherwise. It will be further understood that the terms "comprises" and/or "comprising," "includes" and/or "including," and "have" and/or "having," when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," and "upper" or "top," and "inner" or "outer," may be used herein to describe one element's relationship to another elements as illustrated in the Figures. It will be understood that relative terms are intended to encompass different orientations of the device in addition to the orientation depicted in the Figures.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In general, the system according to exemplary embodiments hereof provides a system and method that collects video content and correlates the video content with time tracked activities. In some embodiments, the system may correlate captured video with work activities billed by the hour. For example, a client may hire a contractor to perform a work activity, and the system may track the time spent by the contractor on the activity while simultaneously capturing video of the contractor at work. The system may then correlate the tracked time with the video to ensure that tracked time and the actual time spent on the activity (as reflected in the captured video) match. In this way, the system may ensure that the billed time (the tracked time) accurately reflects the actual time spent on the activity. It is understood that the system may be tailored to be used with any industry such as, without limitation, legal, medical, consulting, automotive repair, home repair, other types of construction, and/or any other types of industries in which time may be billed by the hour. It also is understood that the example above is meant for demonstration and that the system may be used in any number of ways to correlate tracked time with captured video as will be described further herein.

FIG. 1 shows an overview of an exemplary framework for a video enhanced time tracking system 10 (also referred to herein as simply the system 10) according to exemplary embodiments hereof. As shown, the video enhanced time tracking system 10 may include one or more video capturing devices 100 that may interface with a backend system 200. The video capturing device 100 may interface with the backend system 200 and with users U1, U2, . . . . Un of the system 10 (individually and/or collectively) via one or more application interfaces 300 (e.g., software, a mobile application or "app", a browser, website or Internet interface, or other types of applications) running on the one or more video capturing devices 100.

The system 10 also may include an image recognition system 400. The system 10 also may include other systems, elements and components as required by the system 10 to fulfill its functionalities. In addition, the system 10 may interface with various external systems 500 (e.g., clients, billing services, accounting services, etc.). The video capturing devices 100 and the backend system 200 may preferably be connected to one or more networks 201 (e.g., the Internet, LAN, WAN, wireless communication systems, cellular communication systems, telephony or other types of communication systems or protocols) and may communicate thereby. In some embodiments, the backend system 200 may include a cloud platform (e.g., one or more backend servers), one or more local controllers, or any combination thereof. In some embodiments, the backend system 200 includes a cloud platform that interfaces with one or more local controllers. For example, administrators of the system 10 may interface with the system 10 via a local controller in communication to a cloud platform.

The backend system 200 may include additional applications 202 and databases 204 as will be described in other sections. For example, the backend system 200 may include elements of the image recognition system 400.

In some embodiments, the application 300 includes a mobile application ("app") running on a video capturing device 100. In general, the application 300 may include software to (i) control the operations of the video capturing device 100, (ii) to track time, (iii) to interface with the user Un, (iv) to interface with the backend system 200, and (v) to include and/or run other applications with various functionalities such as the image recognition system 400, reporting, etc.

For example, the application 300 may provide a graphical user interface (GUI) that enables the user Un to interface with the application 300, the backend system 200 and the overall system 10. The application 300 may generally provide an interface with which the user Un may enter information for the system 10 to utilize (e.g., upload to the backend system 200), and interface controls (e.g., touch-screen buttons, etc.) for the user Un to activate while interacting with the system 10. The application 300 also may display data and other types of information that the user Un may read or otherwise consume (e.g., time tracking information, statistics, etc.). In general, and in some embodiments, the application 300 may provide a primary interface with which the user Un may interact with the system 10.

It is understood that various functionalities of the system 10 may be performed by the backend system 200 as described herein, and that all or some of the same functionalities also may be performed by the application 300. In some embodiments, the backend system 200 and the application 300 may work together in sharing and/or otherwise performing the functionalities of the system 10 as described.

To provide a general understanding of the system 10 and the video enhanced time tracking procedure, a summary of steps is described below.

1. First, the user Un launches the application 300 on the video capturing device 100 and orients the video capturing device 100 to capture video of his/her workplace (e.g., the video capturing device 100 may be aimed at the user's computer screen);
2. The application 300 communicates with the backend system 200 and establishes a link between the two for data transfer;
3. Next, the user Un interfaces with the video capturing device 100 (via the application 300) to identify a project (e.g., for a particular client) that he/she intends to work on;
4. The application 300 interfaces with the backend system 200 to set the identified project as active such that time tracked and video captured may be attributed to the correct project;
5. Next, the user Un instructs the application 300 to begin tracking time and to begin capturing video;
6. At this point, the user Un begins to work on the project while the system 10 tracks the time and captures the video;
7. If the user Un needs to take a break, he/she interacts with the application 300 to pause the time tracking and the video capturing;
8. Upon pausing, the system 10 may insert an annotation into the video stream denoting the break with an associated time stamp;
9. When the user Un is ready to begin working on the project again, he/she may initiate the video capturing device 100 (via the application 300) to restart the time tracking and the video capturing;
10. The system 10 may again begin tracking time and capturing video. The newly tracked time and newly captured video is combined with the prior tracked time and prior captured video;
11. The process may continue until (i) the project is completed, (ii) the user Un wishes to send the client a bill, and/or (iii) the project is otherwise paused for whatever reason;
12. The system 10 may correlate the time tracking data with the captured video data, generate one or more reports, and provide one or more reports to the client.

It is understood that the summary of steps described above is meant for demonstration and that the actual process may include additional steps not listed and/or less steps than listed. It is also understood that any of the steps may be performed in any different order.

It should be appreciated that the system 10 provides a unique solution to the need for transparency and reduction in billing fraud in unsupervised and independent work. The system 10 permits a client to obtain confirmation that time billed for their project accurately reflects the time spent on the project, thereby reducing the high probability of fraud that can accompany independent and unsupervised work projects. The system 10 provides the transparency needed by tracking the time spent on a certain project and a video of the project being completed, correlates the video with the time tracked, and provides this information to the client in an easy to understand format. The system 10 also allows for the real time review of the video captured by the video capturing device 100 by the client and/or user Un, as well as the capability to review the video captured at any time during or after the project is completed. Thus, the system 10 solves the need for providing a client transparency in the work hired and confirms the work has been completed efficiently, thereby preventing billing fraud.

Video Capturing Device

Figure 2:
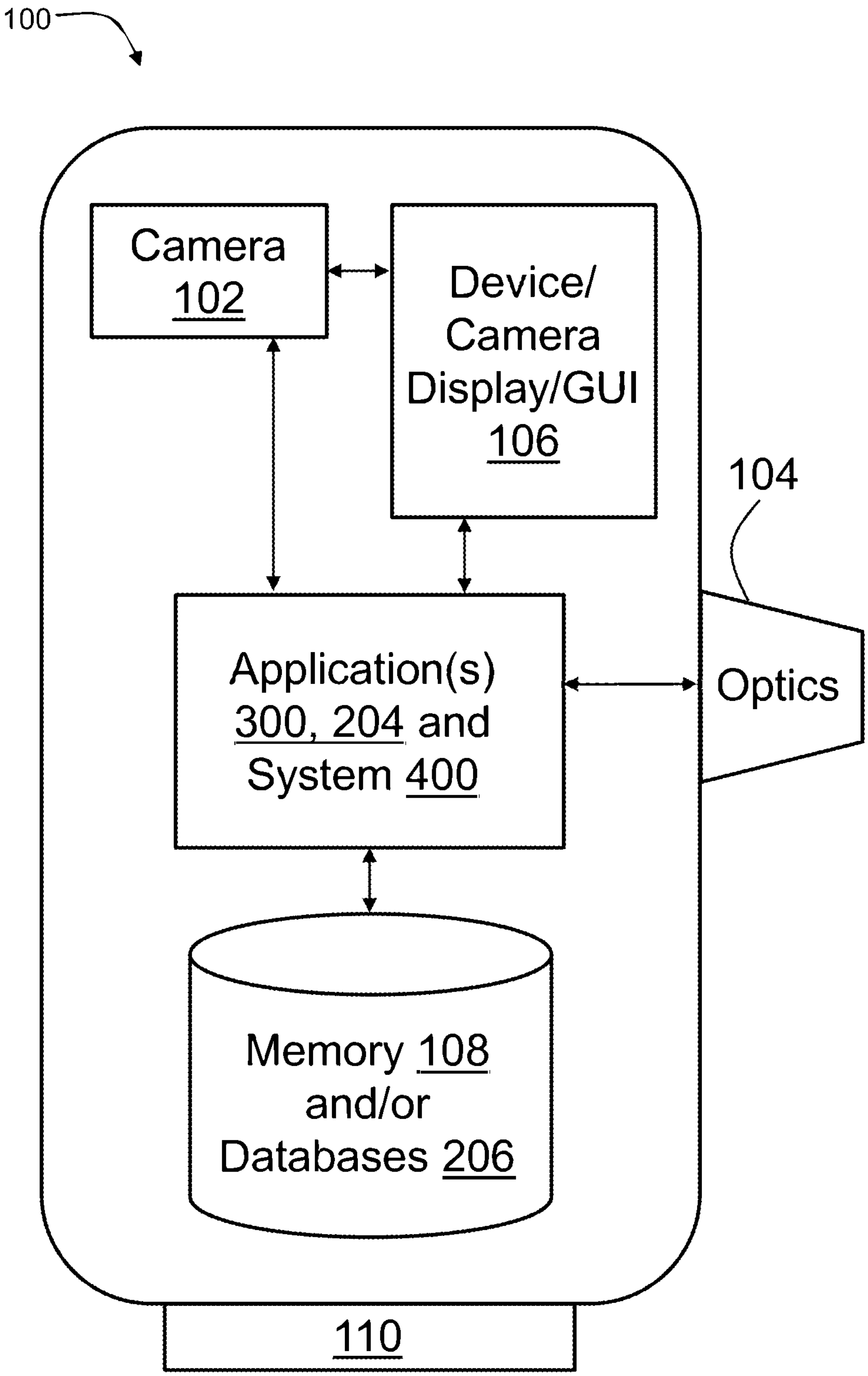
FIG. 2 shows aspects of a video capturing device in accordance with exemplary embodiments hereof.

In some embodiments as shown in FIG. 2, the video capturing device 100 includes a camera 102 including an optical system 104 (e.g., aperture, lens, etc., preferably high-definition), a display 106, memory 108 (e.g., a camera roll and/or other memory to store the video, the application (s) 300, etc.), a processor and an operating system and/or firmware that supports and generally runs the applications 300, 204 and/or the image recognition system 400 (or portions thereof), other elements such as a microphone, a speaker (for providing audible signals to the user Un, a rechargeable battery, and any other components and elements as necessary for the video capturing device 100 to perform its functionalities. It may be preferable that the video capturing device 100 be weatherproof, waterproof, water resistant, etc. so that it may withstand the elements.

The camera 102 may be configured to capture video segments or still images. Additionally, if the camera 102 is configured to capture video, the application 300 may be configured to permit still images to be taken from the video segments captured by the video capturing device 100. The still images, video segments, or images taken from the video segments are preferably stored on the memory 108 of the video capturing device 100, such that when a client or user Un wishes to view the still images, video segments, or images taken from the video segments, they are easily accessible.

In some embodiments, the video capturing device 100 includes a mount 110 adaptable to generally support the video capturing device 100 as necessary for it to perform its functionalities. For example, the mount 110 may include a stand, a clip (e.g., a lapel clip), a lanyard, a zip cord, a clamp, a hanger, a latch, hook and loop material, double-sided tape, adhesive, magnets, other types of attachment and/or mounting mechanisms and any combination thereof. In general, the mount 110 may support the video capturing device 100 in a configuration and orientation that enables the video capturing device 100 to be properly aimed, focused, and otherwise positioned to adequately capture the desired video as required. In some embodiments, the mount 110 may include a camera-stabilizing mount to compensate for unwanted camera movement. It is understood that while the depiction of the mount 110 in FIG. 2 shows it as configured with the bottom of the video capturing device 100, the mount 110 may be configured with any portion of the video capturing device 100 as required (e.g., its bottom, back, sides, top, front and any combination thereof).

For example, in some embodiments, the mount 110 includes a stand (e.g., a desktop stand) adapted to hold the video capturing device 100 upright with its optical system 104 aimed at the user's computer screen whereon the user's work is displayed. In another example, the mount 110 includes a clip that attaches the video capturing device 100 to the user's front lapel, placket, or other area so that the device's optical system 104 is properly aimed. In another example, the mount 110 may include a computer display mount that attaches the video capturing device 100 directly to the user's computer display in a configuration that enables it to take video of the user's work. In some embodiments, the mount 110 is attached to the video capturing device 100 while in other embodiments the mount 110 may include a stand-alone accessory. It is understood that the examples described above are for demonstration and that the mount 110 may include any type of mounting and/or securing mechanism that adequately supports the video capturing device 100, and that the scope of the system 10 is not limited in any way by the type, form or architecture of the mount 110.

In some embodiments, the video capturing device 100 is small in size (e.g., 1" wide.times.1" tall.times.0.25" thick or other sizes) so that it may be easily clipped onto the user's lapel or placket, supported on the user's desktop, clipped to the user's computer display, etc.

Figure 3:
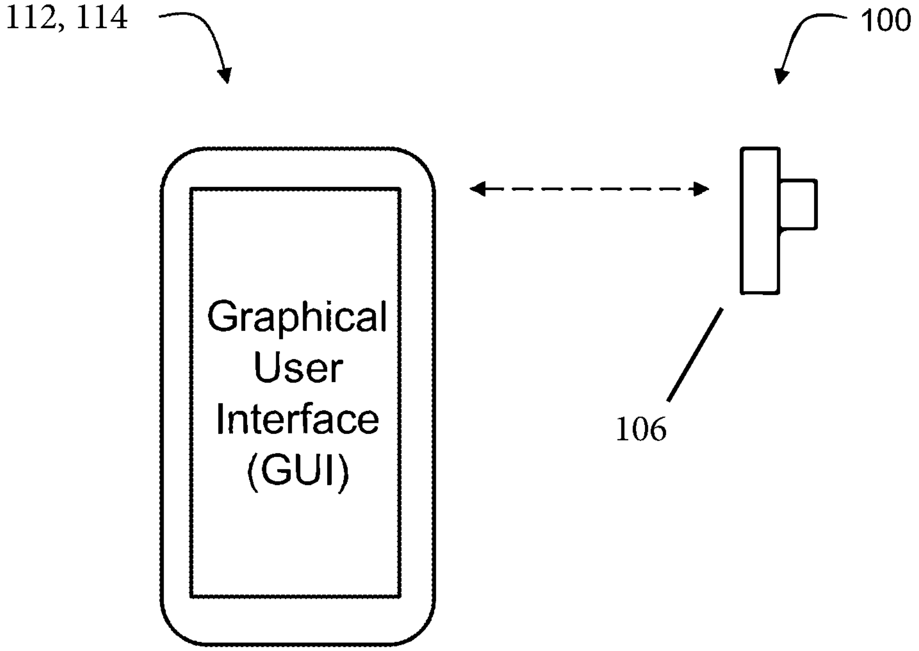
FIG. 3 shows aspects of a video capturing device, a separate device and a mobile device in accordance with exemplary embodiments hereof.
Figure 4:
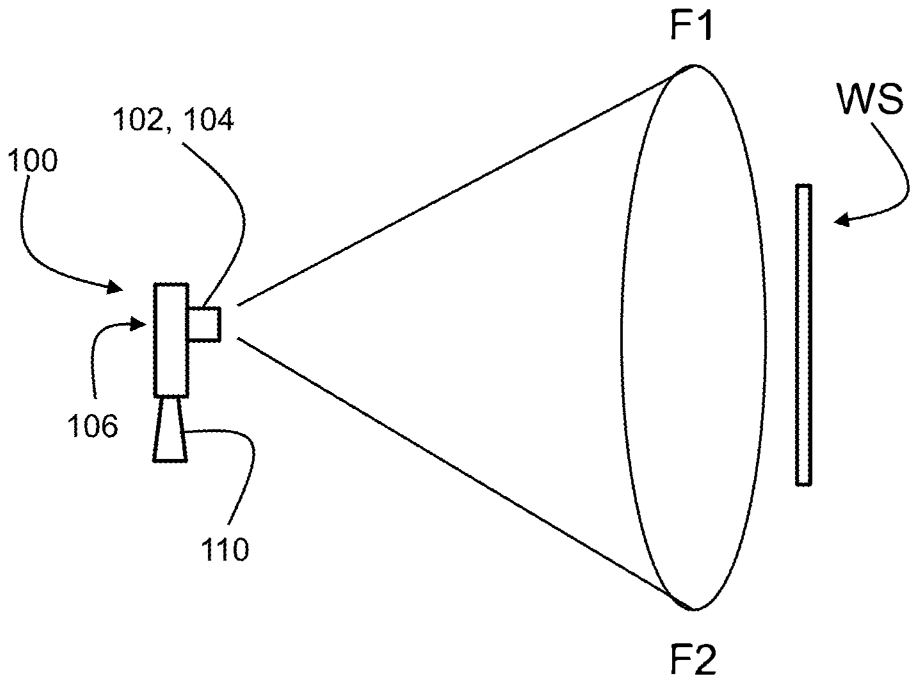
FIG. 4 shows aspects of a video capturing device in accordance with exemplary embodiments hereof.

As shown in FIGS. 3-4, it may be preferable that the video capturing device 100 be positioned and supported such that the user's workspace WS is viewable within the field of view of the camera 102 as depicted by F1 and F2. In this way, as described in other sections, the video capturing device 100 may capture video of the work being performed by the user Un. In some embodiments, the workspace WS may include a desk with a computer monitor, an automobile mechanic's garage, a construction site, an area being cleaned, a doctor's office, an attorney's desk space, and/or any other types of workspaces WS and any combination thereof.

In some embodiments as shown in FIG. 3, if the display 106 is small or otherwise not conveniently positioned for interaction, the display 106 may be mirrored to a separate device 112 such as the user's smartphone, tablet computer, desktop computer, laptop computer, and/or other types of devices with suitable displays. To do so, the separate device 112 may be paired with the video capturing device 100 (e.g., using Bluetooth as represented by the dashed arrow) and the video capturing device 100 may be controlled by the user Un interacting with the separate device 112 (e.g., by interacting with a graphical user interface (GUI) on the separate device's display).

In some embodiments, the video capturing device 100 includes a mobile device 114 such as a smartphone, tablet computer, and/or other types of mobile devices. In this embodiment, the device's camera 102 may include the native camera on the mobile device 114. In some embodiments, the mobile device 114 may include the separate device 112.

In some embodiments, the video capturing device 100, the separate device 112, the mobile device 114 and/or the backend system 200 includes a Global Positioning System (GPS) that is used to identify the location of the video capturing device 100, the separate device 112, the mobile device 114 (and therefor of the user Un) while the video is being captured. In this way, the system 10 may identify the location of the user Un while he/she is working on a particular project for a particular client.

In some embodiments, the video capturing device 100 may include a means for providing privacy to subjects in the video captured by the video capturing device. As discussed further below, the application 300 may include software that is capable of recognizing the face of a person and blurring the face of the person, thereby providing privacy in situations where privacy is a concern (such as in the doctor's office setting).

Application

In some embodiments, the application 300 resides on the video capturing device 100 and generally controls its functionalities and usage. The application 300 includes a graphical user interface (GUI) that may be presented on the device's display 106 and that includes controls (e.g., touchscreen and/or mechanical buttons, etc.) that the user Un may activate to control the system 10. For example, the GUI may include controls adapted to start, pause, restart, end, and otherwise control the system's time tracking and/or video capturing functionalities. The GUI also may include controls and/or other mechanisms that enable the user Un to interface with the system 10 during its general usage (e.g., to log into the system 10, send a bill to a client, etc.). In some embodiments, the application 300 includes voice recognition capabilities so that it may receive and implement voice commands from the user Un. In addition, the application 300 may accommodate any language, and may be configurable for any operating system, including but not limited to Apple macOS, Apple IOS, Microsoft Windows, and/or Google Android OS. It should be appreciated that this list is non-exhaustive, as the application 300 may be used with any operating system.

In some embodiments, the application 300 may present instructions, wizards, and/or other types of guidance to the user Un via the GUI.

In some embodiments, the application's 300 GUI is mirrored to a separate device 112 and/or a mobile device 114 paired with the video capturing device 100. In this way, the user Un may interact with the GUI on the separate device 112 and/or mobile device 114 (which may be more convenient) to control the video capturing device 100 and to generally interact with the system 10. This may be preferable if the display 106 of the video capturing device 100 is small and/or inconveniently positioned.

In some embodiments, the application 300 resides on the separate device 112 and/or the mobile device 114 paired with the video capturing device 100. In this way, the user Un may interact with the application 300 and the GUI on the separate device 112 and/or mobile device 114 (which may be more convenient) to control the video capturing device 100 and to generally interact with the system 10. This may be preferable in that the video capturing device 100 may not be required to include additional processors, operating systems and other elements already included in the separate device 112 and/or the mobile device 114, and instead, may include a microprocessor and/or microcontroller.

In some embodiments in which the video capturing device 100 includes a mobile device 114, the application 300 may reside on the mobile device 114.

In some embodiments, the application 300 includes a timer 302 that when activated (e.g., started by the user Un via a control mechanism), tracks time, and when deactivated (paused or ended), stops tracking time. The application 300 may record information regarding the amount of tracked time and store this information on its internal memory 108 and/or transfer the information to the backend system 200 for storage on its databases 204. The time tracking information may then be processed locally by the application 300 (running on the processor of the video capturing device 100) and/or by the applications 204 in the backend system 200.

In some embodiments, the application 300 includes the necessary drivers to control the functionalities of the video capturing device 100, e.g., to capture video. In some embodiments, the application 300 may control the video capturing device 100 to capture video in parallel and simultaneously with the tracking of the time by the application's timer 302. For example, in some embodiments, the activation of the time tracking functionality automatically activates the video capturing, or vice versa. In this way, each time the time tracking is started, paused, restarted, ended, and/or otherwise controlled, the video capturing also is started, paused, restarted, ended, and/or otherwise controlled in unison. In some embodiments, the system 10 will not track time unless the video capturing device 100 is activated and capturing video in parallel. In other embodiments, the system 10 will track time regardless of whether the video capturing device 100 activated and capturing video in parallel, as discussed further below.

In some embodiments, the application 300 and/or the backend system 200 includes a variety of functionalities associated with time tracking as are known in the art. For example, the application 300 and/or the backend system 200 may store information relating to projects and/or clients to whom the user Un wishes to provide time tracking information (e.g., for the billing of services). The application 300 and/or the backend system 200 may make this information available to the user Un, and the user Un may choose which project and/or client to track time for at any given moment. In this way, the system 10 may track time and capture video and associate this data with the properly associated client and/or project.

Data Streaming, Recording and Reporting

In some embodiments, the video capturing device 100 captures the video in parallel with the time tracking and uploads the captured video to the backend system 200 in real time. The backend system 200 may then live stream the video and make it available for real time viewing to an authorized (and authenticated) client Cn. In addition, the backend system 200 may store the captured video into a video capture database 220 and associate it with the user Un and/or the respective client Cn. The backend system 200 then may make the stored video available to the client Cn and/or the user Un who may view all or portions of the stored video at any time (e.g., on a website, on a media device such as a smartphone, tablet computer, laptop computer, desktop computer, etc.).

In some embodiments, the captured video is correlated and identified with the tracked time taken during the capturing of the video. In this way, there is preferably a one-to-one correlation with the amount of time tracked and the length of the overall captured video. For example, if a user Un uses the system 10 to track one hour's worth of work, the system may capture one hour of associated video. In some embodiments, the system 10 annotates the video with the user's identification information (e.g., his/her name, name of his/her company, etc.), with the client's Cn identification information (e.g., his/her name, name of his/her company, etc.), with a time stamp of when the video was captured, with a GPS location associated with where the video was captured, and with other relevant information and/or annotations.

In some embodiments, the application 300 is configured to track time regardless of whether the video capturing device 100 is activated. This configuration is relevant in embodiments where the video capturing device 100 is configured to capture still images and/or take still images from the video captured by the video capturing device. In these embodiments, if/when the video capturing device 100 is activated after the timer 302 is activated, the system 10 will correlate the activation of the video capturing system 100 with a specific time on from the timer 302, thereby allowing the user Un and/or client Cn to see when the specific video and/or still image from the video capturing device 100 is/was taken.

The configuration of this embodiment is particularly relevant for projects or work that take numerous hours where a client Cn does not wish to view a video of the entirety of the project. In these embodiments, the user Un starts the timer 302, then at predetermined times during the project, the video capturing device 100 is activated and takes either still images or a video of the project. If a video is taken, the video may be of any length sufficient to show the current status of the project at that point in time. The video or still images are then stored in either the internal memory 108 or may be transferred to the database(s) 204 of the backend system 200 for access by the client Cn. The activation of the video capturing device 100 may be manually performed by the user Un and/or client Cn, may be automatically activated based on predetermined time periods input into the application 300, or may be randomly activated. These predetermined time periods may be previously agreed upon by the client Cn and user Un prior to the start of the project and/or work. The client Cn may then access the stored video segments or still images either in real time or any time after the capture of the image or video. This allows the client Cn to verify the project and/or work is being completed efficiently, while simultaneously reducing the amount of storage needed for the video segments and/or still images. In other embodiments, this same concept may be used to confirm the identity of the user Un and/or client Cn who is using the system 10 (especially in the medical field to provide proof a patient was actually seen by a doctor).

In some embodiments, the uploading of the captured video or still images may be uploaded to the backend system 200 by a paired separate device 112 and/or paired mobile device 114. This may be preferable when the video capturing device 100 may not have the storage capacity, the bandwidth, or other technical specifications required for the data transfer.

In some embodiments, the system 10 may provide a client Cn with a link to view the captured video accompanied by a report specifying the amount of tracked time, the specific time and dates associated with the tracked time, the location of the user Un during the time tracking, and/or other information relating to the tracked time, the captured video, the user Un, the client Cn and other information. In other embodiments, the system 10 may generate reports that include representative portions of the captured video for the client Cn to review. In embodiments where the entirety of the project is captured by the video capturing system 100, the representative portions may be extracted from the full video and provided to the client Cn. In embodiments where only segments of the video or still images are captured, the report will be made up of the video segments and/or still images captured. Any reports generated by the system 10 may preferably be compatible with industry standard billing and accounting software. It is understood that the system 10 may present any or all of the captured video and/or any information regarding the tracked time to the client Cn in any format using any methodologies, at any time (including real time streaming, recorded video, etc.) and that the scope of the system 10 is not limited in any way by the way in which the system 10 provides some or all of the captured video to any client Cn.

With respect to the capture of time in the system 10, numerous different ways of capturing time and video may be implemented for different types of billing systems. In embodiments where the project is billed on an hourly basis, the time tracked and corresponding video captured preferably reflects the entirety of the project, such that the client Cn can review the hours billed and confirm that the project was completed in an efficient manner and the work was performed during all hours billed.

In embodiments where the project is billed at a flat rate, the video captured may be used to verify the identity of the user Un, confirm the hired work was the work performed, and/or prove the work was completed to industry or agreed upon standards. In the flat rate billed embodiments, while the time tracking is not as important for billing purposes, the time is preferably still tracked with the video or still images captured, such that the user Un and client Cn can still track how much time was spent on the project and when the video or still images were taken.

In embodiments where a hybrid of flat rate and hourly billing is used, the system 10 will be configured to confirm that the project was actually completed in the time frame agreed upon for the flat rate. For example, if a flat rate is agreed upon for a specific amount of hours to perform a project, the system 10 will either capture the entirety of the project, or video segments and/or still images, at the agreement of the client Cn and user Un. The timer 302 in these embodiments may be configured to either count up from 0:00 to the agreed upon time or may be configured to count down from the agreed upon time to 0:00. In these embodiments, the video tracking system 100 may be configured to be constantly capturing video or may be configured to capture video at specific time segments to confirm the work is being completed as agreed upon.

It should be appreciated that any of these configurations may be used in coordination with any of the billing methods described. For example, if a client Cn and user Un agree to an hourly billing system, but only want a still image taken and sent to the client at the end of each hour, the system 10 may be configured as such. Other configurations of billing type and corresponding video capture/time capture may be utilized as well without departing from the concepts disclosed herein.

Image Recognition System

In some embodiments, the system 10 includes an image recognition system 400 that may comprise a general image recognition system as well as a facial image recognition system. Accordingly, the image recognition system 400 may include an image recognition application and/or a facial recognition application running on the video capturing device 100 and/or the backend system 200. In some embodiments, the image recognition application and the facial recognition application may be combined.

The image recognition system 400 interfaces with the video capturing device 100 to receive images to be processed (e.g., recognized). These images may include faces or other identifiable body parts (to be recognized by the facial recognition application), as well as other types of images such as computer displays, workspaces (e.g., desk tops, rooms, warehouses, etc.), logos, insignia, and other types of images (to be recognized by the image recognition application).

In some embodiments, the image recognition system 400 (through the facial recognition application) is used to recognize the user's face in order to determine and confirm the user's identity. This may take place at the beginning of a timed work session to authenticate that the user Un that is performing the work is the same user Un that registered with the system 10. This also may take place at periodic intervals during the timed work session to ensure that the initially authenticated user Un is still the same user Un throughout the timed session. The periodic intervals may be predetermined and/or random. In one example, this may ensure that a specific contractor hired to perform a specific task by a particular client is in fact the contractor that performs the work throughout the entire process. In some embodiments, the system 10 uses other types of biometric identification technologies to authenticate the user Un in lieu of or in combination with the facial recognition process. For example, the system 10 may include voice recognition, fingerprint (or palm) authentication, retinal scanning, other types of biometric authorization processes used to confirm the identity of the user, and any combination thereof.

In some embodiments, the image recognition system 400 further includes a privacy feature. The privacy feature is configured to blur out or otherwise censor portions of the image that are private or need to be censored. For example, the privacy feature may be configured to blur out or place a black bar over any portions of the User's Un workspace WS that contains sensitive or confidential information. In this example, the image recognition application would recognize specific objects in the workspace WS that are predesignated as private or confidential and will apply the censoring to those specific objects. This can be used to protect trade secret or confidential information that may be shown in the video segments. In another example, the privacy feature may be configured to blur out a person's face. In this example, the privacy feature could be used by doctor offices to blur out the face of a patient for medical privacy purposes. In this example, the facial recognition application would be configured to apply the blur or censor to the relevant person's face after recognition of the person's face. These examples are solely for exemplary purposes, and it should be appreciated that this privacy feature may be used with any portion of the image recognition system 400, including the image recognition application and/or the facial recognition application.

In one example, when the user Un activates the application 300 to begin tracking time and/or to begin capturing video (via the video capturing device 100) the application 300 may ask the user Un to use the facial recognition system 400 to first authenticate his/her identity. Then, once his/her identity has been authenticated, the system 10 may begin tracking time and capturing video. To use the facial recognition system 400, the user Un may position his/her face within the camera's field of view to allow the image recognition system 400 to make the identification as is known in the art.

In some embodiments, the facial recognition application uses biometrics to map facial features from a captured facial image (e.g., from the camera 102) and then compares the information with a database of known faces to find a match and to thereby authenticate the user's identity.

In one example, the facial recognition application may perform one or more acts, including without limitation:

1. Detect, track and score facial images from live video or images (e.g., from the camera 102);
2. Create biometric templates of the best images of faces for comparison to known faces;
3. Compare the biometric template(s) to known faces within one or more databases (in the cloud or otherwise); and
4. Find a positive match and assist in correlating the determined identity with other information (e.g., with the identity of the intended user Un).

In one exemplary embodiment hereof, the image recognition system 400 may implement machine learning (e.g., a machine learning kit library) to detect a face and produce face coordinates for cropping. In this way, the system 10 may create a facial image. The system 10 may then score the detected faces and select the facial images that may include the best resolution. These images may then be sent to the backend system 200 for face recognition. The cropped face (preferably about .about.100 klb in file size) may be sent to the cloud platform for conversion to a biometric template and the image may be matched (e.g., the identity of the facial image may be identified). This may include the backend system 200 interfacing with third-party facial recognition systems and/or databases. The identified face information may then be used to authenticate the identity of the user Un. It may be preferable that this entire process take about <1 second. Additionally, the system 10 may learn to identify specific faces that have been previously designated as private, such that the system 10 may automatically blur out or censor identical faces without telling the system 10 to perform the action.

In some embodiments, the image recognition system 400 (through the image recognition application) is used to recognize elements of the user's workspace WS. For example, the image recognition application may be used to recognize and identify the user's computer display, the top of the user's desk, the user's office, a particular item or object within the user's workspace WS, other areas and/or objects or forms that may generally identify the user's workspace WS and any combination thereof. In doing so, the system 10 may learn to identify when the user Un may be working such that it may automatically begin tracking time and/or capturing video. Additionally, the system 10 may learn to identify what information has been previously designated as confidential or private, such that the system 10 may automatically blur out or censor similar or identical information without predesignating the information as private or confidential. As shown in FIG. 4, it may be preferable that the video capturing device 100 is positioned such that the recognizable elements of the user's workspace WS are within the field of view of the camera 102 as depicted by F1 and F2.

In some embodiments, the image recognition system 400 may be pre-programmed to recognize these types of elements (e.g., using a library of workspace identifying elements), may learn to recognize these elements (using machine learning), may be instructed by the user Un to recognize the elements (e.g., by through the app 300), or by other means.

Figure 5:
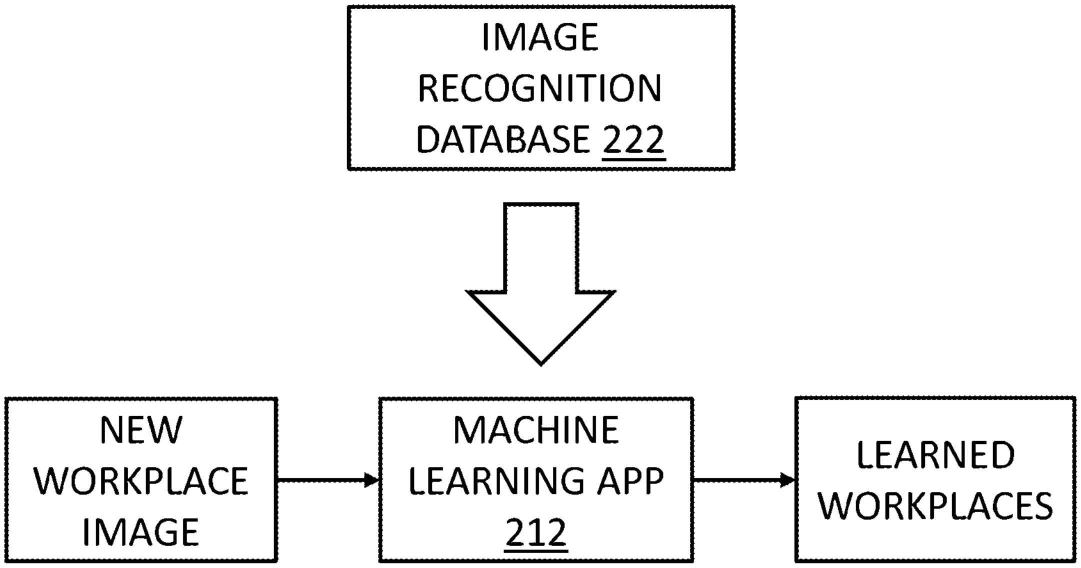
FIGS. 5-6 show aspects of a machine learning process in accordance with exemplary embodiments hereof.

In some embodiments as shown in FIG. 5, the system 10 may implement machine learning (e.g., using the machine learning application 212 as described below) including deep neural networks (DNNs), artificial neural networks (ANNs), etc. to learn characteristics of the user's workspace so that it may thereby recognize the workspace characteristics and attribute them to the user Un. The machine learning application 212 may use any type of learning protocols such as, without limitation, feature learning, representation learning, etc.

In some embodiments of this, the system 10 may store images of the user's workspace (and/or other information regarding the workspace) into the image recognition database(s) 222 for use with the machine learning application 212. As shown in FIG. 5, the system 10 may then capture new images of the user's workspace WS as the user Un indicates to the system 10 that he/she is working (e.g., by activating the timer 302 and/or the camera 102), apply the new workspace images to the machine learning application 212 and the image recognition database 222, and learn to recognize the new and various workspaces that the user Un may use. In this way, the system 10 may learn to recognize when the user Un is working and may automatically initialize the timer 302 to begin tracking time and/or the video capturing device 100 to begin capturing video. In some embodiments the system 10 may recognize when the user Un appears to be working and may subsequently query the user Un to identify the project and/or the client that he/she is working for at the time. Once this is identified, the system 10 may begin capturing the video and time spent and attribute the video and/or the tracked time to the associated project or client.

Figure 6:
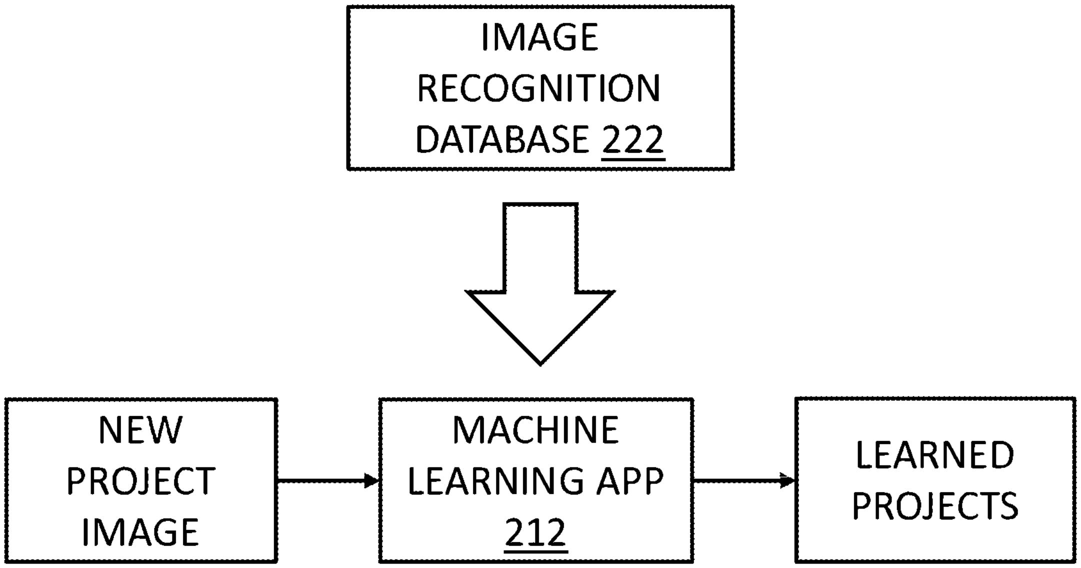

In some embodiments as shown in FIG. 6, the system 10 may implement machine learning (e.g., using the machine learning application 212) to learn characteristics of a particular project so that the system 10 also may learn to identify the project and/or the client for whom the user Un may be working. In some embodiments of this, the system 10 may store images of a particular project into the image recognition database 222 for use with the machine learning application 212. This may include images of a physical project such as construction or auto repair, a particular document on the user's computer screen (e.g., with recognizable client letterhead, logo, branding, etc.) or other types of work-related images. As shown in FIG. 6, the system 10 may then capture new images of the project(s) as the user Un indicates to the system 10 that he/she is working (e.g., by activating the timer 302 and/or the camera 102), apply the new product images to the machine learning application 212 and the image recognition database 222, and learn to recognize the new and various projects that the user Un may periodically work on. In this way, the system 10 may learn to recognize not only when the user Un is working but also for what project and/or client. The system 10 may then automatically initialize the timer 302 to begin tracking time and/or the video capturing device 100 to begin capturing video and attribute the video and tracked time to the particular project and/or client.

System Structure

Figure 7:
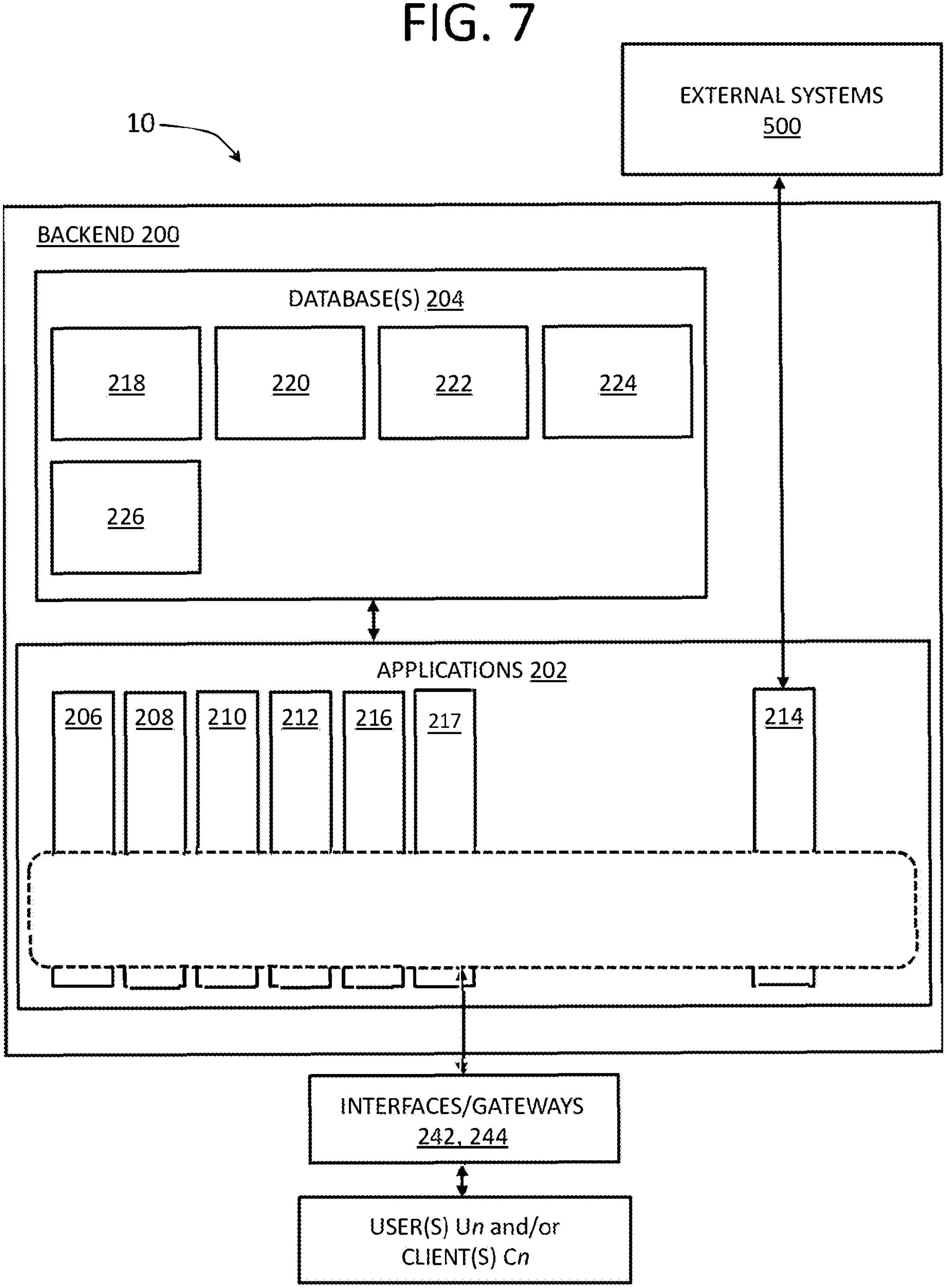
FIG. 7 shows aspects of a video enhanced time tracking system computing environment in accordance with exemplary embodiments hereof.

FIG. 7 shows aspects of an exemplary video enhanced time tracking system 10 of FIG. 1. As shown, the system 10 and backend system 200 comprises various internal applications 202 and one or more databases 204, described in greater detail below. The internal applications 202 may generally interact with the one or more databases 204 and the data stored therein.

The database(s) 204 may comprise one or more separate or integrated databases, at least some of which may be distributed. The database(s) 204 may be implemented in any manner, and, when made up of more than one database, the various databases need not all be implemented in the same way. It should be appreciated that the system is not limited by the nature or location of database(s) 204 or by the manner in which they are implemented.

Each of the internal applications 202 may provide one or more services via an appropriate interface. Although shown as separate applications 202 for the sake of this description, it is appreciated that some or all of the various applications 202 may be combined. The various applications 202 may be implemented in any manner and need not all be implemented in the same way (e.g., using the same software languages, interfaces or protocols).

In some embodiments, the applications 202 may include one or more of the following applications 202:

1. Time tracking application(s) 206. Note that the time tracking application 206 may correlate and/or interact with the application 300 and/or timer 302 in regard to the application's time tracking functionalities.
2. Video capturing application(s) 208. Note that the video capturing application 208 may correlate and/or interact with the application 300 and/or video capturing device 100 and/or camera 102 in regard to the application's video capturing functionalities.

3. Image recognition application(s) 210. Note that the image recognition application 210 may correlate and/or interact with the image recognition system 400, the image recognition application, and/or the facial recognition application.
4. Machine learning application(s) 212. This application may receive any type of input data from any applicable system and/or element such as the application 300, the video capturing device 100, the user Un, the external systems 500, any other system and/or element and any combination thereof.
5. Data input/output applications(s) 214. This application may input and/or output any type of data from or to any applicable system and/or element such as the application 300, the video capturing device 100, external systems 500 (e.g., user's clients), any other system and/or element and any combination thereof.
6. Data reporting application(s) 216. This application may generate any type of report regarding the use and/or functionalities of the system 10 including tracked time, captured video, historical data, any other types of data and/or information and any combination thereof.
7. Privacy application(s) 217. This application may blur out or otherwise censor private or confidential information contained in the images and/or video captured by the video capture device 100, and may correlate and/or interact with the image recognition system 400, the image recognition application, and/or the facial recognition application.
7. Navigational application(s) 218. This application may include a Global Positioning System (GPS) or other types of geolocation systems to locate the position of the video capturing device 100, the separate device 112 and/or the mobile device 114 (and therefore location of the user Un) during the capturing of the video.

The applications 202 also may include other applications and/or auxiliary applications (not shown). Those of ordinary skill in the art will appreciate and understand, upon reading this description, that the above list of applications is meant for demonstration and that the system 10 may include other applications that may be necessary for the system 10 to generally perform its functionalities as described in this specification. In addition, as should be appreciated, embodiments or implementations of the system 10 need not include all of the applications listed, and that some or all of the applications may be optional. It is also understood that the scope of the system 10 is not limited in any way by the applications that it may include.

In some embodiments, the database(s) 204 may include one or more of the following databases 204:

1. Time tracking database(s) 218. This database may store any type of time tracking data and/or other types of information captured by, related to, and/or required by the application 300 and/or the timer 302.
2. Video capture database(s) 220. This database may store any type of video data and/or other types of information captured by, related to, and/or required by the video capturing device 100 and/or the application 300.
3. Image recognition database(s) 222. This database may store any data and/or other types of information related to and/or required by the image recognition system 400, the image recognition application and/or the facial recognition application. For example, the database 222 may include information regarding the different users Un, workspaces WS, workspace items, projects, and/or other elements required for these objects to be recognized by the system 10.
4. Client and project database(s) 224. This database may store any information regarding the clients and/or projects that the user Un may be working on at any given moment.
5. Data report(s) database(s) 226. This database may store any reports of any kind generated by the system 10.

It is understood that the above list of databases is meant for demonstration and that the system 10 may include some or all of the databases, and also may include additional databases as required. It is also understood that the scope of the system 10 is not limited in any way by the databases that it may include.

Various applications 202 and databases 204 in the video enhanced time tracking system 10 may be accessible via interface(s) 242. These interfaces 242 may be provided in the form of APIs or the like and made accessible to external users Un and/or clients Cn via one or more gateways and interfaces 244 (e.g., via a web-based application 300 and/or a mobile application 300 running on the video capturing device 100 and/or on a client's personal device such as a mobile phone, tablet computer, desktop computer, laptop computer, etc.).

It is understood that any aspect and/or element of any embodiment described herein or otherwise may be combined in any way to form new embodiments all of which are easily understood by a person of ordinary skill in the art and all of which are within the scope of the system 10.

Those of ordinary skill in the art will appreciate and understand, upon reading this description, that embodiments hereof may provide different and/or other advantages, and that not all embodiments or implementations need have all advantages.

Computing

The services, mechanisms, operations and acts shown and described above are implemented, at least in part, by software running on one or more computers or computer systems or devices. It should be appreciated that each user device is, or comprises, a computer system.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 8:
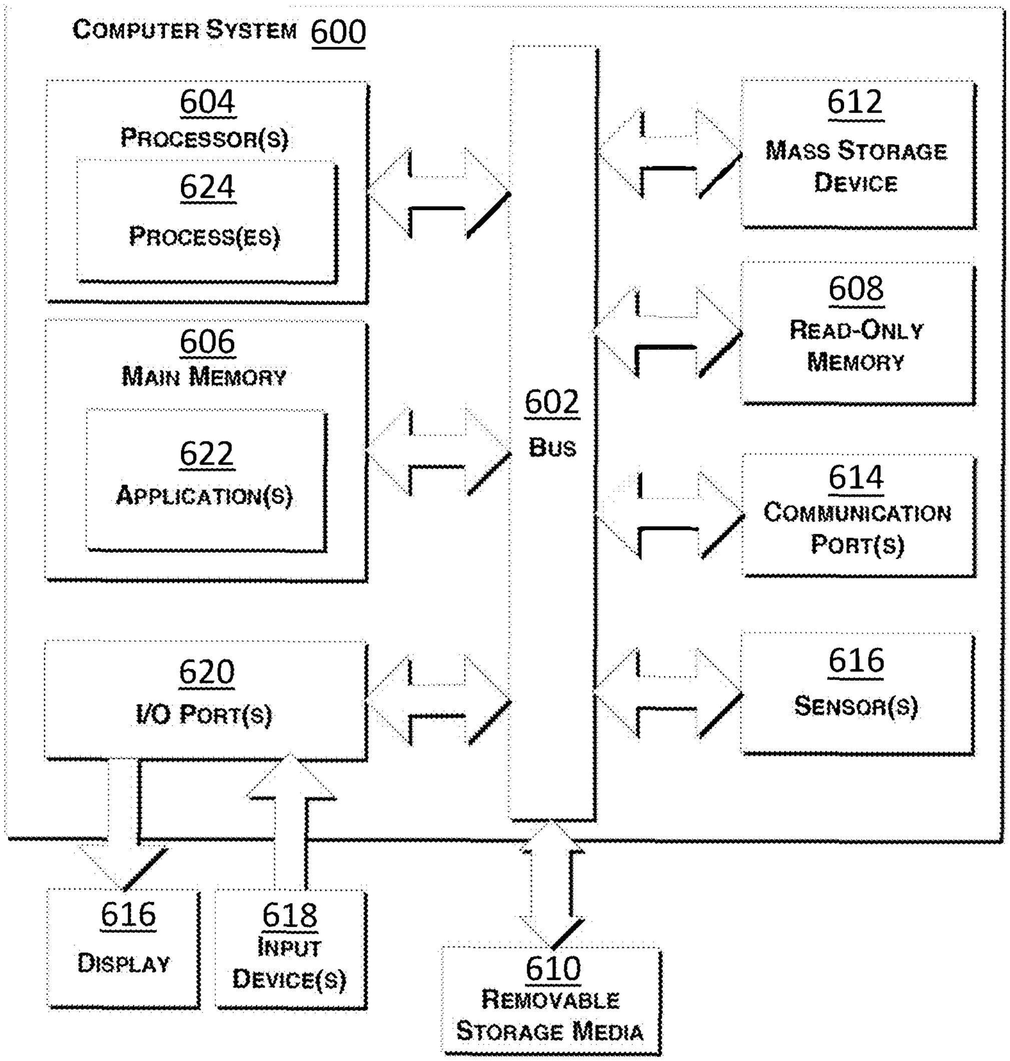
FIG. 8 depicts aspects of computing and computer devices in accordance with exemplary embodiments hereof.

FIG. 8 is a schematic diagram of a computer system 600 upon which embodiments of the present disclosure may be implemented and carried out.

According to the present example, the computer system 600 includes a bus 602 (i.e., interconnect), one or more processors 604, one or more communications ports 614, a main memory 606, removable storage media 610, read-only memory 608, and a mass storage 612. Communication port(s) 614 may be connected to one or more networks by way of which the computer system 600 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 604 can be (or include) any known processor, such as, but not limited to, an Intel® Itanium® or Itanium 2. RTM. processor(s), AMD® Opteron® or Athlon MP® processor(s), or Motorola® lines of processors, and the like. Communications port(s) 614 can be any of an RS-232 port for use with a modem-based dial-up connection, a 10/100 Ethernet port, a Gigabit port using copper or fiber, or a USB port, and the like. Communications port(s) 614 may be chosen depending on a network such as a Local Area Network (LAN), a Wide Area Network (WAN), a CDN, or any network to which the computer system 600 connects. The computer system 600 may be in communication with peripheral devices (e.g., display screen 616, input device(s) 618) via Input/Output (I/O) port 620. Some or all of the peripheral devices may be integrated into the computer system 600, and the input device(s) 618 may be integrated into the display screen 616 (e.g., in the case of a touch screen).

Main memory 606 can be Random Access Memory (RAM), or any other dynamic storage device(s) commonly known in the art. Read-only memory 608 can be any static storage device(s) such as Programmable Read-Only Memory (PROM) chips for storing static information such as instructions for processor(s) 604. Mass storage 612 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 602 communicatively couples processor(s) 604 with the other memory, storage and communications blocks. Bus 602 can be a PCI/PCI-X, SCSI, a Universal Serial Bus (USB) based system bus (or other) depending on the storage devices used, and the like. Removable storage media 610 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor, or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 606 is encoded with application(s) 622 that support(s) the functionality as discussed herein (an application 622 may be an application that provides some or all of the functionality of one or more of the mechanisms described herein). Application(s) 622 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 604 accesses main memory 606 via the use of bus 602 in order to launch, run, execute, interpret or otherwise perform the logic instructions of the application(s) 622. Execution of application(s) 622 produces processing functionality of the service(s) or mechanism(s) related to the application(s). In other words, the process(es) 624 represents one or more portions of the application(s) 622 performing within or upon the processor(s) 604 in the computer system 600.

It should be noted that, in addition to the process(es) 624 that carries (carry) out operations as discussed herein, other embodiments herein include the application 622 itself (i.e., the un-executed or non-performing logic instructions and/or data). The application 622 may be stored on a computer readable medium (e.g., a repository) such as a disk or in an optical medium. According to other embodiments, the application 622 can also be stored in a memory type system such as in firmware, read only memory (ROM), or, as in this example, as executable code within the main memory 606 (e.g., within Random Access Memory or RAM). For example, application 622 may also be stored in removable storage media 610, read-only memory 608, and/or mass storage device 612.

Those skilled in the art will understand that the computer system 600 can include other processes and/or software and hardware components, such as sensor(s) 616 and/or an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

Exemplary Embodiments

As discussed above, it is to be understood that the invention is not to be limited to the disclosed exemplary embodiments, but on the contrary, is intended to cover various modifications and equivalent arrangements included within the spirit and scope of the claims. The following exemplary embodiments are included solely as practical examples of the concepts and features of the invention as disclosed and are in no way limiting as to the practical uses of the invention. Numerous other exemplary embodiments other than the ones discussed below (such as consulting, automotive repair, and other construction projects) may utilize the invention disclosed herein without departing from the disclosed concepts.

The following exemplary embodiment provides the system 10 as used in the home repair industry. In the home repair embodiment, the user Un would be a workman and the client Cn would be a homeowner/renter/occupant (herein "homeowner" for this embodiment). For this embodiment, the homeowner and workman would first come to an agreement regarding the project to be done on the homeowner's house, and the method of billing the project, whether that be hourly, a fixed rate, or a hybrid of the two. When the workman arrives at the homeowner's home, the workman first launches the system 10 via the application 300 and orients the video capture device 100 to capture video of the workspace in the homeowner's home. In this embodiment, the workspace would be the area of the home that needs repair, whether it be plumbing, electrical, cosmetic, and so on. If this embodiment utilizes the machine learning of FIG. 6, then the machine learning application 212 would capture video and/or images of the workspace. Once the workman launches the application 300, the application 300 will communicate with the backend system 200 to establish a link for data transfer.

Next, the workman interfaces with the video capturing device 100 and application 300 to identify the project to be completed, the client information, and any other information relevant for the final report. Once the workman completes this step, the application 300 interfaces with the backend system 200 to set the identified project as active such that the time tracked, video captured, and GPS location (if utilized) may be attributed to the correct project.

Next, the workman instructs the application 300 to begin tracking time. Depending on the agreement of the homeowner and workman, the video capturing device 100 may automatically be activated and begin capturing video upon the activation of the timer 302, the video capturing device 100 may take a still image showing that the work on the project has begun, or the video capturing device 100 may not be immediately activated. Once this step commences, the timer 302 begins tracking the time of the project, and the video capturing device may begin taking video, may take a still image, or may be awaiting further instruction from the workman or application 300 to activate at a later time.

In embodiments where the video capturing device 100 is automatically activated along with the timer 302, should the workman wish to take a break, the workman will interact with the application 300 to pause the time tracking and video capture. Once the video capturing and timing is paused, the system 10 may annotate the video captured with an indication that a break has been taken. Once the workman is ready to begin working on the project again, the workman will interact with the application 300 to resume the time tracking and video capture, thereby instructing the system 10 to again begin tracking time and capturing video of the project. This process will continue until the project is complete, the workman wants to send the client the bill, and/or the project is paused for any other reason.

In embodiments where a still image is taken, additional still images may be taken throughout the project displaying the workman working on the project. The time periods that the still images are taken may be random or predetermined upon agreement by the workman and homeowner. Preferably the still images are taken at random to dissuade the workman from fraudulently billing when still images are not being taken. Alternatively, the still images may be extracted from a constant video stream from the video capturing device 100 such that the full video of the project is still stored in the application 300, but the homeowner only reviews still images extracted from the video at specific time periods.

As with the above embodiment, should the workman wish to take a break, the workman will interact with the application 300 to pause the time tracking and image capture. Once the image capturing and timing is paused, the system 10 take a still image showing the workman taking a break and may annotate the time clock and/or still images captured with an indication that a break has been taken. Once the workman is ready to begin working on the project again, the workman will interact with the application 300 to resume the time tracking and image capture, thereby instructing the system 10 to again begin tracking time and capturing images of the project. This process will continue until the project is complete, the workman wants to send the client the bill, and/or the project is paused for any other reason.

In embodiments where the video does not automatically begin with the tracking of time, video segments may be taken throughout the project displaying the workman working on the project. The time periods that the video segments are taken may be random or predetermined upon agreement by the workman and homeowner. Preferably the video segments are taken at random to dissuade the workman from fraudulently billing when video segments are not being taken. The process for taking breaks and completing the project will be the same for this embodiment as discussed above.

Once the project is complete, the system 10 will correlate the time tracking with the captured video data, the still images taken, and/or the video segments taken and provide one or more reports to the homeowner. Thus, the homeowner can confirm that the workman hired was the worker who worked on the project, the project was completed within the agreed upon time or was completed for the fixed rate, and the project was completed correctly and to industry standards. This final report will contain the final bill for the project, whether it be done hourly, as a fixed rate, or a hybrid of the two. The final report will also contain the full video, still images, and/or video segments taken by the system 10. Therefore, the system 10 will provide confirmation to the homeowner that the time billed accurately reflects the time spent on the project and the project agreed upon was the project completed, and provides transparency for the homeowner in reviewing what work has been completed and confirms that the work has been completed efficiently.

It should be appreciated that this above exemplary embodiment may be utilized in many industries, including home repair, construction, medical, auto repair, legal, and/or any other industry that utilizes hourly or flat rate billing.

The following exemplary embodiment provides the system 10 as used in the medical industry. In the medical embodiment, the user Un would be a doctor and the client Cn would be a patient. While the general above exemplary embodiment may be used for the medical industry, the unique fraud associated with either overbilling of medical services or claiming that a patient saw a doctor without actually seeing them creates the need for another embodiment utilizing the concepts disclosed herein. This embodiment may similarly be used in the legal industry, where these similar unique frauds may also occur.

In the medical exemplary embodiment, the doctor or patient, whoever is utilizing the system 10, first launches the system 10 via the application 300 and orients the video capture device 100 to capture video or images of the doctor's office. If this embodiment utilizes the machine learning of FIGS. 5-6, then the machine learning application 212 would capture video and/or images of the doctor's office as well as the doctor and patient. Once the doctor launches the application 300, the application 300 will communicate with the backend system 200 to establish a link for data transfer.

Next, the doctor and/or patient interfaces with the video capturing device 100 and application 300 to identify the services to be completed, the patient and/or doctor information, and any other information relevant for the final report. Once the patient and/or doctor completes this step, the application 300 interfaces with the backend system 200 to set the identified service as active such that the time tracked, video captured, and GPS location (if utilized) may be attributed to the correct medical service.

Next, the doctor or patient instructs the application 300 to begin tracking time. At this point, the video capturing device 100 may automatically be activated and begin capturing video upon the activation of the timer 302, the video capturing device 100 may take a still image showing the doctor and patient together in the doctor's office. Once this step commences, the timer 302 begins tracking the time of the medical services, and the video capturing device may begin taking video or taking still images.

Once the medical service(s) is complete, the system 10 will correlate the time tracking with the captured video data and/or the still images taken and provide one or more reports to the patient and/or doctor. Thus, the patient and/or doctor can confirm that the patient was actually present with the doctor for these services and the services rendered were fair and the patient was not overbilled. This final report will contain the final bill for the project, as well as the full video and/or still images taken by the system 10. Therefore, the system 10 will provide confirmation to the patient and doctor that the medical service requested was actually provided, the doctor and patient were together for the medical service and provides transparency for anyone reviewing whether the service has been completed and completed efficiently.

In the medical exemplary embodiment, the privacy features are important, because in general, healthcare privacy is required by law. As such, the facial features of the patient and/or doctor may be blurred out or censored to any other party viewing the final report. This may also be relevant in the legal industry, where the attorney's workspace may contain confidential or trade secret information that must be censored before being provided to the client.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

I claim:

1. A reporting system for measuring work productivity of at least one worker working for a client, the system comprising:

a video capturing apparatus having a camera, a display, and a processor;

the processor configured to store images of various workspaces of the at least one worker and various projects performed by the at least one worker;

the processor configured to cause a first algorithm to identify a particular workspace among the various workspaces, the first algorithm being a machine learning algorithm that learns the characteristics of the various workspaces to identify the particular workspace among the various workspaces;

the processor configured to cause a second algorithm to identify a particular project among the various projects;

the processor configured to track time, and to capture image data from the particular workspace while the particular project is performed;

the processor configured to attribute the captured image data and the tracked time to the particular workspace, the particular project, the at least one worker, and the at least one client;

wherein the processor configured to prepare a report of the particular project, based on the particular workspace, the tracked time, and the captured image data; and wherein the processor is configured with a privacy feature that hides a predetermined portion of the image data designated as confidential.

2. The reporting system of claim 1, wherein the second algorithm is machine learning algorithm that learns characteristics of the various projects to identify the particular project among the various projects, and redacts portions of the particular project identified as confidential.

3. The reporting system of claim 1, wherein the processor configured to initialize a timer to begin tracking time and initialize the camera to begin capturing image data from the particular workspace while the particular project is performed.

4. The reporting system of claim 3, wherein the processor further configured to transmit the tracked time and the captured image data to a backend system;

the backend system having a plurality of databases and at least one network in communication with the video capturing apparatus; and the backend system configured to assemble and store a client-accessible sequential tracking image data from the captured image data, the tracking image data annotated with time-in/time-out annotations corresponding to a start command and a stop command issued by the at least one worker.

5. The reporting system of claim 3 wherein the processor further configured to automatically initialize the timer and the camera when the at least one worker is performing the particular project.

6. The reporting system of claim 1, wherein the processor is configured with facial recognition functionality to identify the at least one worker and wherein the privacy feature blurs the at least one worker's face if the worker is designated as confidential.

7. The reporting system of claim 6, wherein the facial recognition functionality is configured to detect, track, and score facial images, create biometric templates of best images for comparison, compare biometric templates with known workers, and find a positive match for determining a worker's identity.

8. A reporting system for measuring work productivity of a plurality of workers working for a plurality of clients, the reporting system comprising:

a plurality of video capturing apparatuses, each having a camera, a display, and a processor;

the plurality of video capturing apparatuses configured to store images of various workspaces of the plurality of workers and various projects performed by the plurality of workers;

the processor configured to cause a first algorithm to identify a particular workspace among the various workspaces, wherein the first algorithm is a machine learning algorithm that learns characteristics of the various workspaces to identify the particular workspace among the various workspaces;

the processor configured to cause a second algorithm to identify a particular project among the various projects;

the processor configured to track time, and to capture image data from the particular workspace while the particular project is performed;

the processor configured to attribute the captured image data and the tracked time to the particular workspace, the particular project, at least one worker among the plurality of workers, and at least one client among the plurality of clients;

wherein the processor configured to prepare a report of the particular project, based on the particular workspace, the tracked time, and the captured image data; and wherein the processor is configured with a privacy feature that hides a predetermined portion of the image data designated as confidential.

9. The reporting system of claim 8, wherein the second algorithm is machine learning algorithm that learns characteristics of the various projects to identify the particular project among the various projects, and redacts portions of the particular project identified as confidential.

10. The reporting system of claim 8, wherein the processor configured to initialize a timer to begin tracking time and initialize the camera to begin capturing image data from the particular workspace while the particular project is performed.

11. The reporting system of claim 10, wherein the processor further configured to transmit the tracked time and the captured image data to a backend system;

the backend system having a plurality of databases and at least one network in communication with the video capturing apparatus; and the backend system configured to assemble and store a client-accessible sequential tracking image data from the captured image data, the tracking image data annotated with time-in/time-out annotations corresponding to a start command and a stop command issued by the at least one worker.

12. The reporting system of claim 10 wherein the processor further configured to automatically initialize the timer and the camera when the at least one worker is performing the particular project.

13. The reporting system of claim 8, wherein the processor is configured with facial recognition functionality to identify the at least one worker and wherein the privacy feature blurs the at least one worker's face if the worker is designated as confidential.

14. The reporting system of claim 13, wherein the facial recognition functionality is configured to detect, track, and score facial images, create biometric templates of best images for comparison, compare biometric templates with known workers, and find a positive match for determining a worker's identity.

15. A method of reporting work productivity of at least one worker working for a client, the method comprising:

providing an application having at least one video capturing apparatus having a camera, a display, and a processor;

storing images of various workspaces of the at least one worker and various projects performed by the at least one worker;

using a first algorithm to identify a particular workspace among the various workspaces, wherein the first algorithm is a machine learning algorithm for learning characteristics of the various workspaces to identify the particular workspace among the various workspaces;

using a second algorithm to identify a particular project among the various projects; tracking time, and capturing image data from the particular workspace while the particular project is performed;

attributing the captured image data and the tracked time to the particular workspace, the particular project, the at least one worker, and the at least one client;

preparing a report of the particular project, based on the particular workspace, the tracked time, and the captured image data; and hiding a predetermined portion of the image data designated as confidential.

16. The method of claim 15, further comprising using machine learning algorithm for learning characteristics of the various projects to identify the particular project among the various projects, and redacting portions of the particular project identified as confidential.

17. The method of claim 16, further comprising initializing a timer to begin tracking time and initializing the camera to begin capturing image data from the particular workspace while the particular project is performed.

* * * * *